United States Patent
Newman et al.

(10) Patent No.: US 9,048,514 B2
(45) Date of Patent: Jun. 2, 2015

(54) REPLACEMENT BATTERY INDICATOR ON A BATTERY POWERED DEVICE

(75) Inventors: Nader Newman, Brampton (CA); Nicholas John James, Milton (CA); Adrian Joseph Stagg, Belfountain (CA)

(73) Assignee: PSION INC., Mississuaga, Ontario (CA)

( * ) Notice: Subject to any disclaimer, the term of this patent is extended or adjusted under 35 U.S.C. 154(b) by 567 days.

(21) Appl. No.: 12/766,171

(22) Filed: Apr. 23, 2010

(65) Prior Publication Data

US 2011/0260877 A1 Oct. 27, 2011

(51) Int. Cl.
*G08B 21/00* (2006.01)
*H01M 10/48* (2006.01)

(52) U.S. Cl.
CPC ..................... *H01M 10/48* (2013.01)

(58) Field of Classification Search
CPC .................................................. G01R 31/3679
USPC .......... 340/636.19, 636.1; 320/132, 137, 114; 702/63; 324/434, 435, 431
See application file for complete search history.

(56) References Cited

U.S. PATENT DOCUMENTS

| | | | |
|---|---|---|---|
| 6,087,808 A * | 7/2000 | Pritchard | 320/132 |
| 6,295,002 B1 * | 9/2001 | Fukuda | 340/636.1 |
| 6,538,413 B1 * | 3/2003 | Beard et al. | 320/114 |
| 7,019,659 B2 * | 3/2006 | Kobayashi et al. | 340/636.1 |
| 2003/0094321 A1 * | 5/2003 | Hirata et al. | 180/65.2 |
| 2004/0008031 A1 * | 1/2004 | Arai et al. | 324/429 |
| 2005/0231375 A1 * | 10/2005 | Kingston | 340/574 |
| 2008/0067979 A1 * | 3/2008 | Hayasaki | 320/136 |
| 2009/0045774 A1 * | 2/2009 | Rayl et al. | 320/114 |

\* cited by examiner

*Primary Examiner* — Vernal Brown
*Assistant Examiner* — Hongmin Fan

(57) ABSTRACT

A method is provided for presenting battery degradation of a rechargeable battery to a user of an electronic device. The method comprising the following steps. An initial capacity and a remaining capacity of the rechargeable battery are obtained. The battery degradation is determined as a proportion of a difference between the initial capacity and the remaining capacity to the initial capacity. The battery degradation is visually displayed on a display of the electronic device as a battery gauge. A system to implement the method is also provided.

18 Claims, 4 Drawing Sheets

REPLACEMENT BATTERY INDICATOR ON A BATTERY POWERED DEVICE

The present invention relates generally to battery powered devices and specifically to a method for displaying on the battery powered device an indicator of the battery discharge.

BACKGROUND

The proliferation of wireless data transfer technologies, including cellular technology, Wi-Fi and Bluetooth for example, has resulted in an explosion in the number of portable devices available to consumers. Examples of such portable devices include personal entertainment devices, such game, music and video players, personal communication devices, such as smart phones and personal digital assistants, data collection devices and portable computers.

The vast majority of these portable devices are powered by rechargeable batteries. The batteries may be off-the-shelf batteries or comprise a prepackaged battery pack. In use, a portable device user charges the batteries using a standard power source, such as an electrical outlet. The batteries may be charged while remaining within the portable device or via an external battery charger. Once the batteries are charged they are used to power the portable device so it can move freely. Once the batteries are drained, they are recharged and the process begins anew.

However, rechargeable batteries have a fixed life-cycle. That is, they have a limited number of charge cycles before they can no longer be effectively recharged. This is referred to as battery degradation. Therefore, as rechargeable batteries are used it only becomes possible to recharge them to a maximum capacity that is a fraction of their original capacity. Once this maximum capacity falls below a certain threshold, the batteries will no longer be practically useful.

However, it is difficult for the user to know when the rechargeable batteries will need to be replaced. Typically, the user will not know that the rechargeable batteries need to be replaced until they fail to last for a usable time period. Accordingly, a number of extra batteries need to be kept on hand to ensure that replacement batteries are available when the rechargeable batteries can no longer effectively be recharged. The more portable devices one has, the larger the inventory and associated costs for storing the replacement batteries. Furthermore, the replacement batteries also have a limited life span and degrade when they are in storage.

Accordingly, it is desirable to provide a system and method that facilitates determination and display of the battery degradation so that the user can make an informed decision when to purchase new rechargeable batteries.

SUMMARY

As described above, a common problem among portable device users is not knowing when to replace the device's batteries. Some users are aware that batteries should typically be replaced after two years, but this depends on how the batteries are actually being used and charged. Replacing batteries prematurely results in users wasting money as the batteries could still be utilized. Conversely, users who do not attempt to manage this have no indication and a false expectation as to how long the battery will last. Accordingly, a visual indication of the batteries degradation is provided in an easy to understand format is provided so that the user does not need to understand battery terminology.

In accordance with an aspect of the present invention, there is provided a method for presenting battery degradation of a rechargeable battery to a user of an electronic device, the method comprising the steps of: obtaining an initial capacity and a remaining capacity of the rechargeable battery; determining the battery degradation as a proportion of a difference between the initial capacity and the remaining capacity to the initial capacity; visually presenting the battery degradation on a display of the electronic device as a battery gauge.

In accordance with a further aspect of the present invention, there is provided an electronic device configured to present battery degradation of a rechargeable battery to a user, the electronic device comprising: a display; a power supply; memory for storing computer readable code; and a processor configured to execute the computer readable code, thereby implementing the steps of: obtaining an initial capacity and a remaining capacity of the rechargeable battery; determining the battery degradation as a proportion of a difference between the initial capacity and the remaining capacity to the initial capacity; and visually presenting the battery degradation on the display of the electronic device as a battery gauge.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
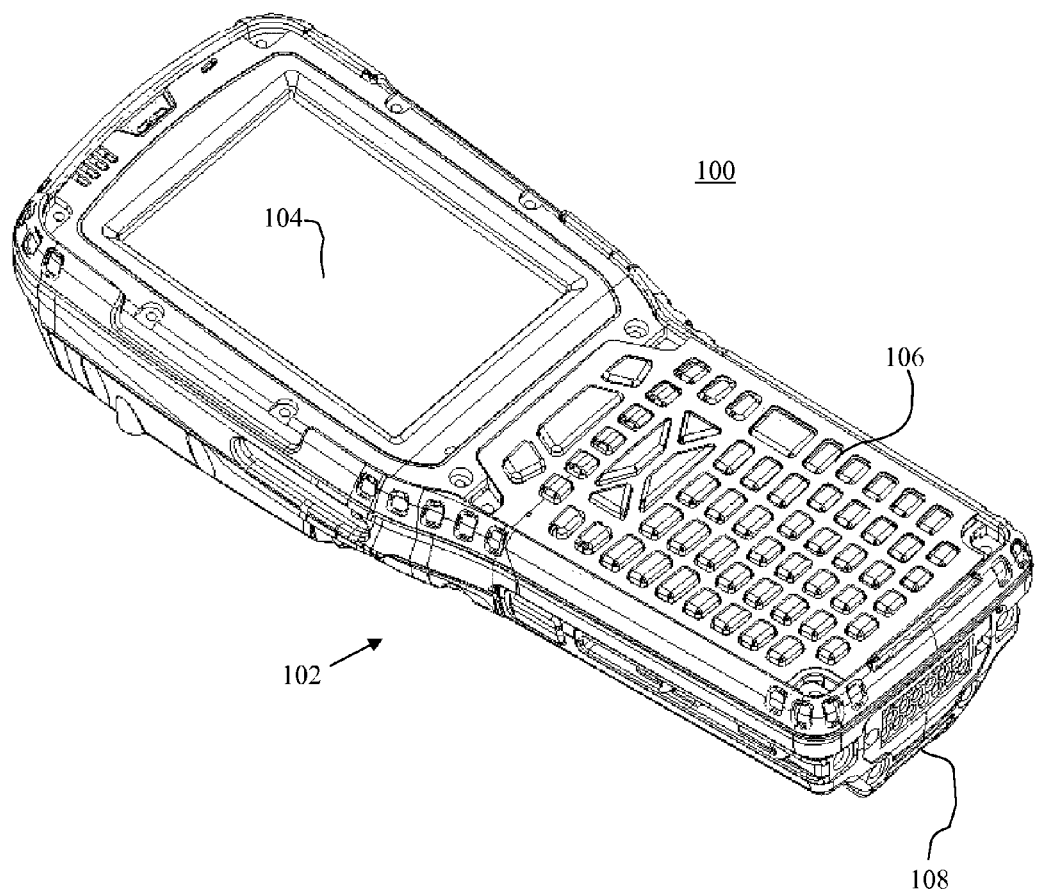
FIG. 1 is a drawing of a sample portable computer using a rechargeable battery.

For convenience, like numerals in the description refer to like structures in the drawings. Referring to FIG. 1, a portable computer is illustrated generally by the numeral 100. The portable computer 100 comprises a main body 102, a display 104, a keyboard 106 and a battery compartment 108 for housing a rechargeable battery (not shown). For ease of explanation, the rechargeable battery will simply be referred to as the battery. The portable computer 100 and the battery are in communication using a battery interface (not shown). The battery interface may use known or proprietary protocols for communication. The portable computer 100 also comprises a plurality of optional components such as a barcode scanner or radio-frequency identification (RFID) tag reader, for example.

Figure 2:
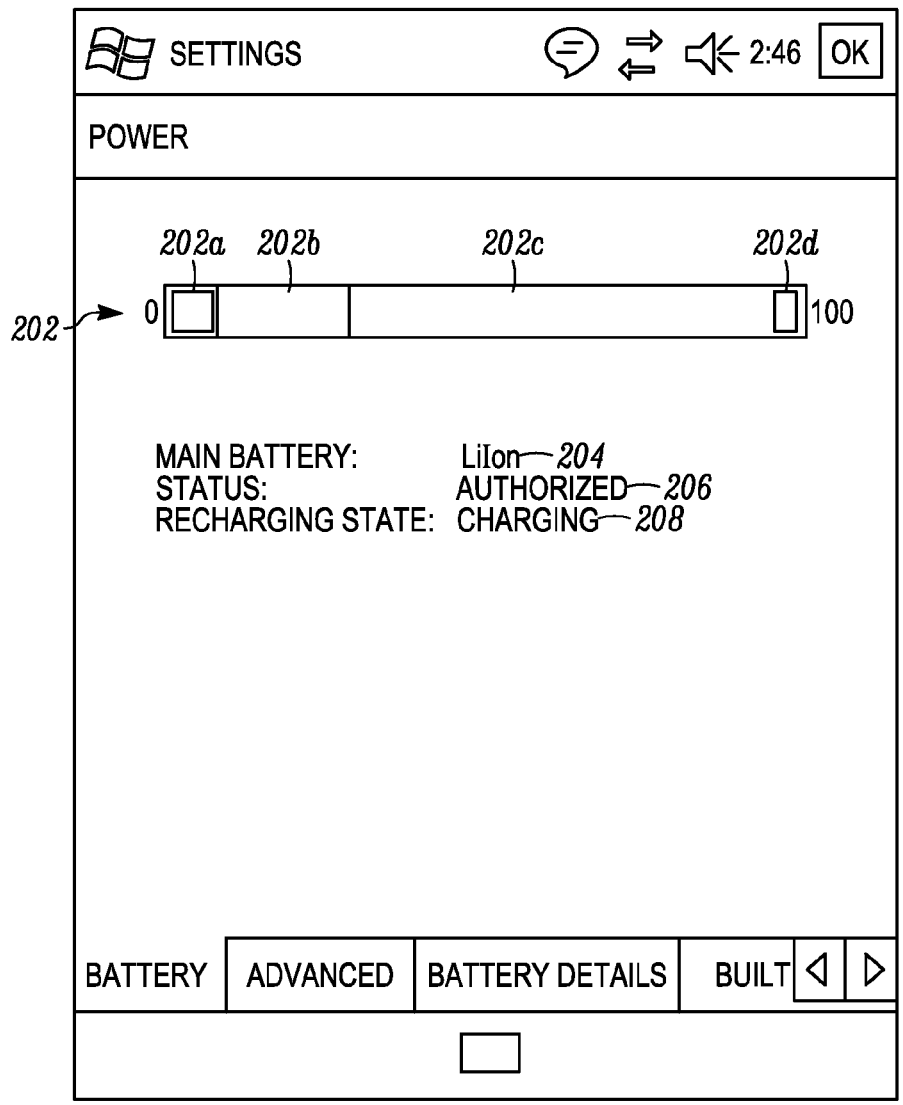
FIG. 2 is a screen shot of a battery information scree.

As will be appreciated, battery software is provided on the portable computer 100 that determines the battery degradation and presents the information on the screen 104. In the present embodiment, the battery degradation information is displayed graphically as a "battery gauge". Referring to FIG. 2, a screen shot illustrating a battery information screen is shown generally by numeral 200. The battery information screen 200 includes a battery gauge 202, a battery type 204, a battery status indicator 206 and a charge status indicator 208.

The charge status indicator 208 indicates whether or not the battery is being charged. This provides the user with a quick check to verify that the battery is being charged when the portable computer 100 is placed in a cradle, docking station, or otherwise connected to a power source. The battery status indicator 206 indicates whether or not the battery has been authorized. A battery is considered to be authorized if it contains the necessary credentials. Each battery includes a battery memory having predefined credentials, which are read by the battery software. The credentials can be authenticated using known or proprietary encryption methods, which are beyond the scope of the present invention. The battery type 204 indicates the type of battery, also retrieved from the predefined credentials on the battery memory.

The battery gauge 202 is bar-shaped in the present embodiment and comprises three different condition sections. A critical condition section 202a, is located at the left-most portion of battery gauge 202. The critical condition section is relatively small. It is used to indicate to the user that, due to battery degradation, the battery discharge is critical and the portable computer 100 will likely not function effectively, even with a fully charged battery. Thus, the battery should be replaced. A good condition section 202c is located at the right-most portion of the battery gauge 202. The good condition section 202c is relatively large and is used to indicate to the user that battery degradation is not a concern. A warning condition section 202b is located between the critical condition section 202a and the good condition section 202c. The warning condition section 202b is mid-sized. It is used to indicate to the user that battery degradation is becoming a concern and that a new battery should be obtained, as it will soon be needed. The portable computer 100 will likely work just long enough to be efficient.

Battery degradation is illustrated on the battery gauge 202 by a degradation indicator 202d. The degradation indicator 202d begins at the right-most edge of the battery gauge 202 and moves to the left as the battery degrades. Accordingly, the degradation indicator 202d can be seen to increasingly occupies a greater portion of the battery gauge as the battery degrades In the present embodiment the critical condition section 202a is coloured red, the warning condition section 202b is coloured yellow and the good condition section 202c is coloured green. The degradation indicator 202d is in the form of a black bar that covers an increasing portion of the battery gauge 202 as the battery degrades. Accordingly, the user will quickly be able determine the level of degradation by the visible colours. That is, for example, if all three colours are visible then the battery is in good condition. As less green becomes visible then the user knows that battery is degrading. Once green is no longer visible then user should consider obtaining a replacement battery. Once yellow is no longer visible then the user should consider replacing the battery with the replacement battery.

As will be appreciated by a person of ordinary skill in the art, the size of each of the good section 202c, the warning section 202b and the critical section 202a depends on how much charge the battery contains and how much charge the portable computer 100 needs to be considered efficient. Thus, the proportion of each of the sections 202a, 202b and 202c may vary for different implementations. For example, a portable computer 100 that is used three hours between recharging will have different requirements for a portable computer 100 that is used eight hours between recharging.

The following describes how the battery degradation is determined by the software. There are two general types of batteries: smart batteries and dumb batteries. Smart batteries include intelligence to monitor certain parameters and determine the remaining battery capacity. These parameters are used by the battery software to generate the battery gauge 202. Dumb batteries lack the intelligence present in the smart batteries but still include parameters that can be used by the battery software to determine and generate the battery gauge 202.

In the present embodiment, the battery gauge 202 is displayed to the user via a battery utility screen. A person of ordinary skill in the art will appreciate that the battery gauge 202 can be displayed as part of other utility or status screens. In an alternate embodiment, the battery gauge 202 could be displayed on the main screen of the portable computer 100, either constantly or intermittently.

Figure 3:
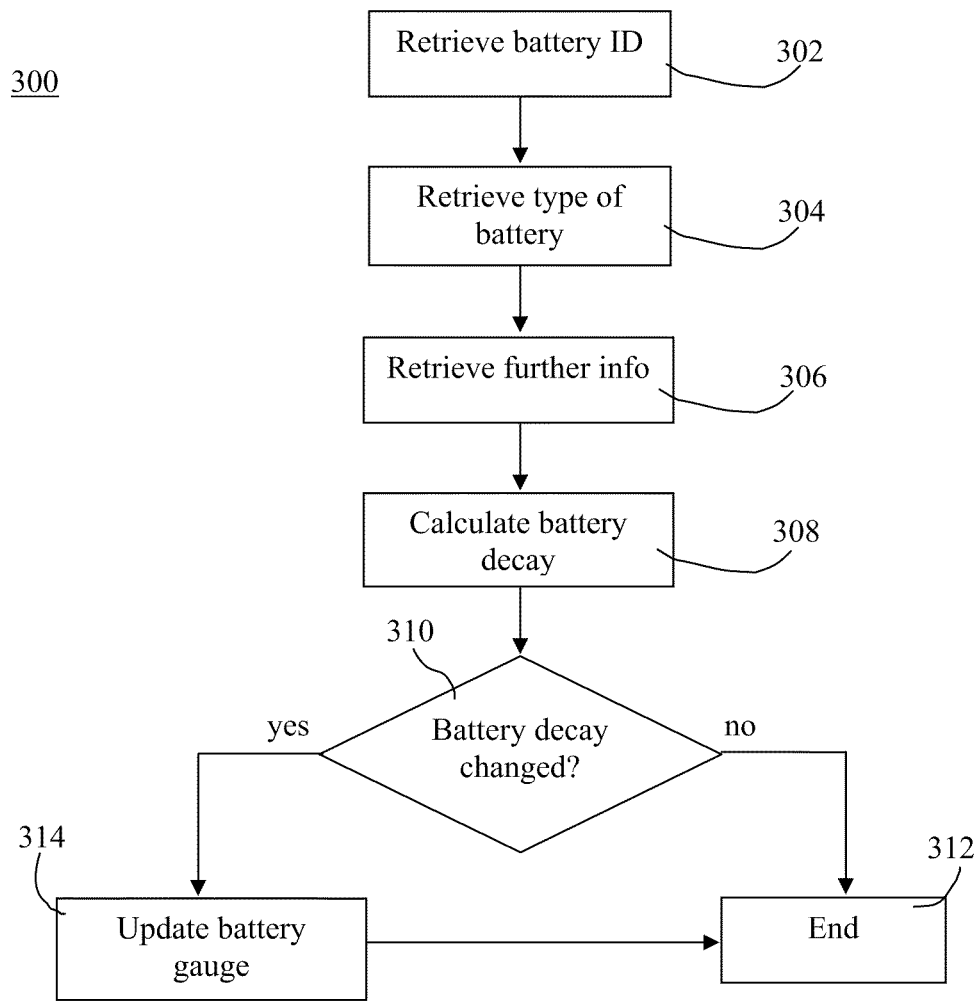
FIG. 3 is a flow chart describing steps for determining battery discharge for smart batteries.

Referring to FIG. 3, a flow chart illustrating a method for determining battery degradation of a smart battery is shown generally by numeral 300. In the present embodiment, the battery degradation is determined after each charge cycle. A person of ordinary skill in the art will appreciate that the frequency of determining battery degradation can vary depending on the implementation.

Smart batteries generally provide a battery degradation calculation, but do not provide it as a total percentage of the maximum capacity. At step 302, a battery identifier is retrieved. Each battery identifier is unique and is used for identifying the battery.

At step 304, a chemistry or type for the battery is retrieved. In the present embodiment, this information is retrieved from the battery itself. Alternatively, the chemistry or type information may be able to be determined based on a portion of the battery identifier. The chemistry or type of battery is used to determine which of a plurality of predefined degradation factors to use when calculating battery degradation.

At step 306, further battery information is retrieved from the battery. This information includes date of manufacture, voltage, temperature, and the maximum battery capacity and the calculated battery capacity. The maximum battery capacity represents the maximum capacity of the battery when new. The calculated battery capacity represents the capacity of the battery remaining after the battery has calculated the degradation.

At step 308, the battery percentage decay is calculated. The battery percentage decay refers to the degradation and represents a percentage of the battery that can no longer be used. Specifically, Battery Percentage Decay=(Maximum Battery Capacity−Calculated Battery Capacity)/Maximum Battery Capacity.

At step 310, it is determined whether or not the battery percentage decay has changed since the previous calculation. If the battery percentage decay has not changed, then the method continues to step 312 and the operation is complete. If the battery percentage decay has changed, then the method continued to step 314 and the degradation progress bar on the battery gauge is updated to represent the change in degradation. The method then continues to step 312.

Figure 4:
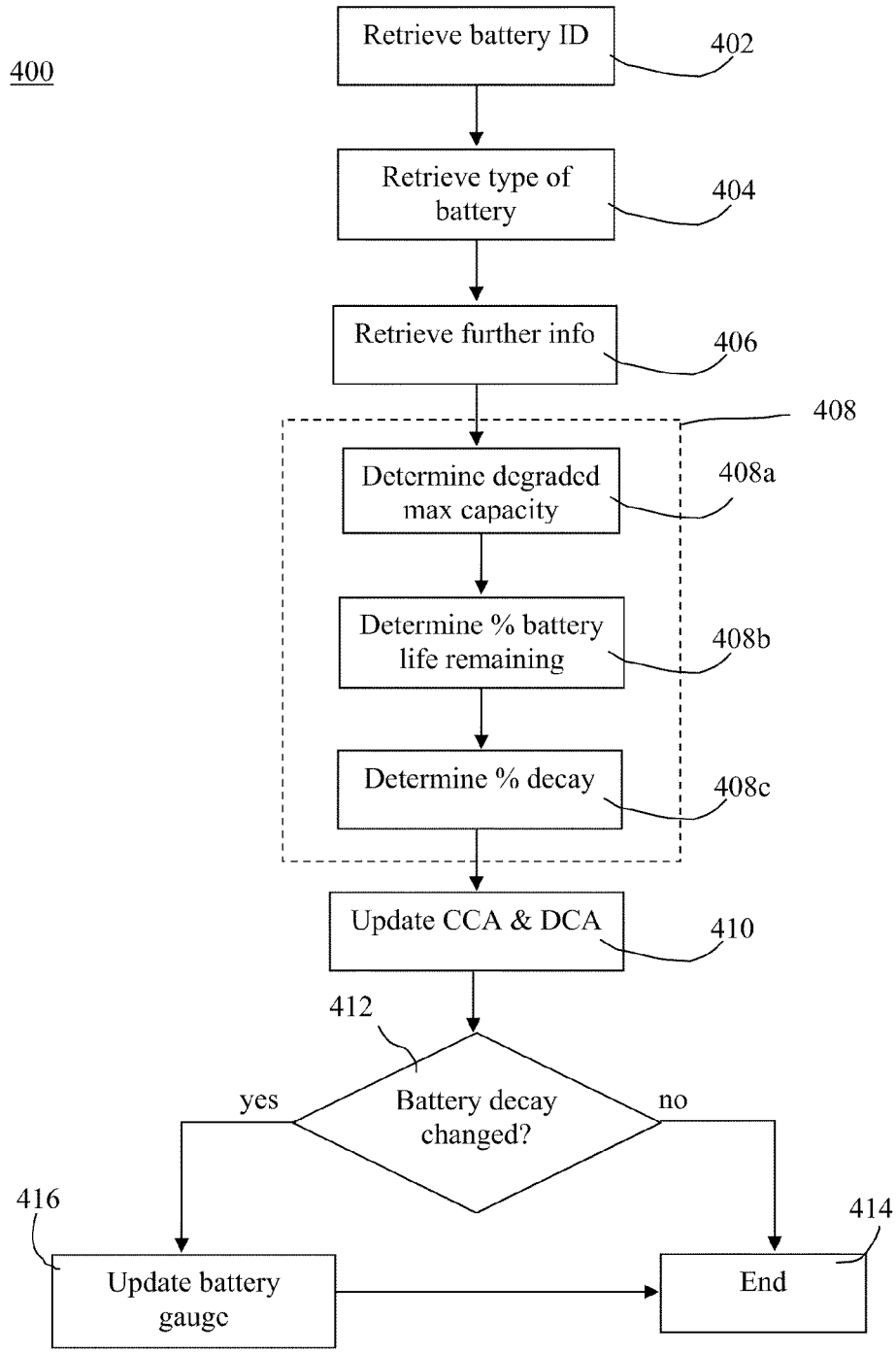
FIG. 4 is a flow chart describing steps for determining battery discharge for dumb batteries.

Referring to FIG. 4, a flow chart illustrating a method for determining battery degradation of a dumb battery is shown generally by numeral 400. In the present embodiment, the battery degradation is determined after each charge cycle. A person of ordinary skill in the art will appreciate that the frequency of determining battery degradation can vary depending on the implementation.

At step 402, the battery identifier is retrieved. Each battery identifier is unique and is used for identifying the battery. At step 404, the chemistry or type for the battery is retrieved.

At step 406, further battery information is retrieved from the battery. This information includes date of manufacture, voltage, temperature and the maximum battery capacity. This information also includes a charge current accumulator (CCA), a discharge current accumulator (DCA) and the degradation factor. The CCA is a count of how many times the battery has been charged. The DCA is a count of how many times the battery has been discharged. The degradation factor is used in calculating the battery degradation by adjusting the CCA and DCA as different battery chemistries will have a different discharge curve when charging and discharging.

At step 408, the battery percentage decay is calculated in several steps. At step 408a, a degraded maximum capacity of the battery is determined as Degraded Maximum Capacity=Maximum Battery Capacity−(CCA+DCA)/Degradation Factor. The degraded maximum capacity represents the maximum capacity of the battery after degradation has been factored.

At step 408b, a battery percent life left is determined as Battery Percent Life Left=(Degraded Maximum Capacity*100)/Maximum Battery Capacity. The battery percent life left reflects the degraded maximum capacity as a percentage of the maximum battery capacity.

At step 408c, the battery percentage decay is determined as Battery Percentage Decay=100−Main Battery Percent Life Left.

At step 410, depending on the capacity at which the battery started charging the CCA and DCA are updated accordingly. That is, in order to increase the CCA or DCA count the battery should complete approximately one full charge or discharge, respectively. In order to determine whether one full charge or discharge has occurred the capacity of the battery needs to be analyzed. If the battery for example has 90% of its capacity and is then charged, then the CCA will not be updated as this is not close enough to be considered a full charge. On the other hand if the battery has 20% capacity and is charged then the CCA will be updated. The same applies to discharging but opposite is considered for the capacity. Similarly, if only 10% of the battery capacity is used before a charge, then the DCA will not be updated as this is not close enough to be considered a full discharge. On the other hand if 80% of the battery capacity is used before a charge, then the DCA will be updated.

At step 412, it is determined whether or not the battery percentage decay has changed since the previous calculation. If the battery percentage decay has not changed, then the method continues to step 414 and the operation is complete. If the battery percentage decay has changed, then the method continued to step 416 and the degradation progress bar on the battery gauge is updated to represent the change in degradation. The method then continues to step 414.

Accordingly, it will be appreciated that in both embodiments described above, the battery gauge is updated to graphically display the battery degradation to the user.

In an alternate embodiment once the battery percentage decay reaches a predefined threshold, a new battery is automatically ordered. This threshold, referred to for clarity as an order threshold, can be determined based on a number of different criteria. For example, the order threshold can be based on an estimated time to receive the new battery once it has been ordered. Thus, the longer the estimated time to receive the battery, the lower the order threshold and vice versa. In another example, the order threshold can be based on the estimated usage of the mobile computer. Thus, the more frequently, or longer, the portable computer 100 is expected to be used, the lower the order threshold and vice versa. In yet another example, the order threshold can be based on the number of batteries already in inventory. Thus, the greater the number of batteries in inventory, the higher the order threshold and vice versa. Further examples, and combinations thereof, will become apparent to a person of ordinary skill in the art.

Once the order threshold is crossed, the battery degradation software executing on the portable computer 100 contacts a predefined supplier to order the new battery. In the present embodiment, the portable computer 100 is equipped with Wi-Fi access and the battery degradation software attempts to connect with a supplier server via a Wi-Fi network to order the battery. Alternatively, the portable computer 100 is equipped with radio technology and the battery degradation software attempts to connect with a supplier server via a cellular network, such as a 3G network for example, to order the battery. In yet an alternate embodiment, the portable computer 100, may wait until it is docked and communicate with a supplier server via a wired network connection. In yet an alternate embodiment, the portable computer 100 may communicate with a local server rather than directly with the supplier server. In this embodiment, the local server is configured to accumulate parts requests and submit an order at predefined intervals.

Although described with specific reference to portable devices, such as the portable computer 100, it will be appreciated by a person of ordinary skill in the art that the invention can be implemented on other electronic devices that use rechargeable batteries including, for example, laptop computers, personal digital assistants, mobile phones, portable media devices, such as mp3 players, digital image recording devices, such as cameras and camcorders, battery powered vehicles and the like.

Further, although described with reference to a bar-shaped indicator, the battery gauge can be displayed differently to the user. For example, a pie-shaped indicator may also be used. As another example, a multiple-bar graph may also be used that takes other factors, such as temperature, into consideration. Other graphical representations will be apparent to a person skilled in the art.

Yet further, although the embodiments described above are described with specific reference to determining battery degradation for the battery of the electronic device itself, the invention may also be applied to batteries external to the electronic device.

For example, rechargeable batteries are often charged in external charging stations. An electronic device, such as the portable computer 100 described above, can be used to communicate with a plurality of batteries via RFID. In order to facilitate this communication, each battery is configured with a writable RFID tag. At predefined intervals, such as after each charge cycle for example, the battery writes its battery information to the RFID tag. Also, the battery identifier included in the battery information, or at least a portion thereof, is clearly labeled on the battery so that it is visible to the user.

The battery software is configured to represent a plurality of battery gauges 202, one of each battery. The batter identifier is presented along with each of the battery gauges so that the user can easily reconcile a battery gauge with its corresponding battery. As will be appreciated by a person of ordinary skill in the art, the number of battery gauges 202 that can be accommodated on the display 104 depends on the size and resolution of the display 104. Accordingly, if there are too many battery gauges 202 to be easily accommodated on the display, multiple pages can be used.

Although the embodiment described above uses RFID technology to communicate between the battery and the portable computer 100, other wireless technologies, such as Wi-Fi and Bluetooth or even a wired interface can be used.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be embodied within one or more computer-readable media such as memory devices, thereby making a computer program product or article of manufacture according to the invention. As such, the terms "software" and "application" as used herein are intended to encompass a computer program existent on any computer-readable medium such as on any memory device.

Examples of memory devices include, hard disk drives, diskettes, optical disks, magnetic tape, semiconductor memories such as FLASH, RAM, ROM, PROMS, and the like.

A machine embodying the invention may involve one or more processing systems including, for example, a CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although the invention has been described with reference to certain specific embodiments, various modifications thereof will be apparent to those skilled in the art without departing from the scope of the invention as defined by the appended claims.

What is claimed is:

1. A method of operation of a portable computing device powered by a rechargeable battery wherein the rechargeable battery is housed within the portable computing device, the method comprising:
    retrieving, from the rechargeable battery, by the portable computing device, information including a type of the rechargeable battery, a charge current accumulator (CCA), a discharge current accumulator (DCA) and a predefined degradation factor, wherein the predefined degradation factor is determined based upon the type of the rechargeable battery;
    obtaining, by the portable computing device, an initial capacity of the rechargeable battery;
    determining, by the portable computing device, a battery degradation as a function of the CCA, the DCA, and the predefined degradation factor; and
    displaying, on a display of the portable computing device, the battery degradation relative to the initial capacity of the rechargeable battery as a battery gauge.

2. The method of claim 1, wherein the battery degradation equates to (CCA+DCA)/predefined degradation factor.

3. The method of claim 2, wherein the predefined degradation factor used to adjust the CCA and DCA is dependent on the type of the rechargeable battery.

4. The method of claim 2, wherein the CCA and DCA are updated when the rechargeable battery completes approximately one full charge or discharge.

5. The method of claim 4, wherein if the rechargeable battery has 20% capacity and is charged then the CCA will be updated, and if 80% of capacity of the rechargeable battery is used before a charge, then the DCA will be updated.

6. The method of claim 1, wherein obtaining the initial capacity of the rechargeable battery further comprises obtaining the initial capacity from the rechargeable battery.

7. The method of claim 1, wherein obtaining the initial capacity of the rechargeable battery further comprises: obtaining the initial capacity and battery information from the rechargeable battery; and using the battery information to calculate the a degraded maximum capacity.

8. The method of claim 1, wherein the rechargeable battery is external to the portable computing device.

9. The method of claim 8, further comprising implementing the operations of obtaining, determining, and displaying for a plurality of rechargeable batteries external to the portable computing device.

10. The method of claim 1, further comprising:
    automatically ordering a replacement battery when the battery degradation passes a predefined order threshold, wherein the threshold is based on an estimated time to receive a new battery once it has been ordered.

11. The method of claim 10, wherein the predefined order threshold is also based on an estimated usage of the portable computing device.

12. The method of claim 10, wherein the predefined order threshold is also based on a number of batteries already in inventory.

13. A portable computing device powered by a rechargeable battery wherein the rechargeable battery is housed within the portable computing device, the portable computing device comprising:
    a display;
    a memory storing computer readable code; and
    a processor configured to execute the computer readable code to:
        retrieve, from the rechargeable battery, information including a type of the rechargeable battery, a charge current accumulator (CCA), a discharge current accumulator (DCA) and a predefined degradation factor, wherein the predefined degradation factor is determined based upon the type of the rechargeable battery;
        obtain an initial capacity of the rechargeable battery;
        determine a battery degradation as a function of the CCA, the DCA, and the predefined degradation factor; and
        display the battery degradation on the display relative to the initial capacity of the rechargeable battery as a battery gauge.

14. The portable computing device of claim 13, wherein the rechargeable battery is external to the portable computing device.

15. The portable computing device of claim 14 further comprising a communication interface operating to receive information from the rechargeable battery.

16. The portable computing device of claim 15, wherein the communication interface is a wireless communication interface.

17. The portable computing device of claim 13, wherein the processor is further operating to automatically order a replacement battery when the battery degradation passes a predefined order threshold, wherein the threshold is based on an estimated time to receive a new battery once it has been ordered.

18. The portable computing device of claim 17, wherein the predefined order threshold is also based on an estimated usage of the portable computing device.

* * * * *